UNITED STATES PATENT OFFICE.

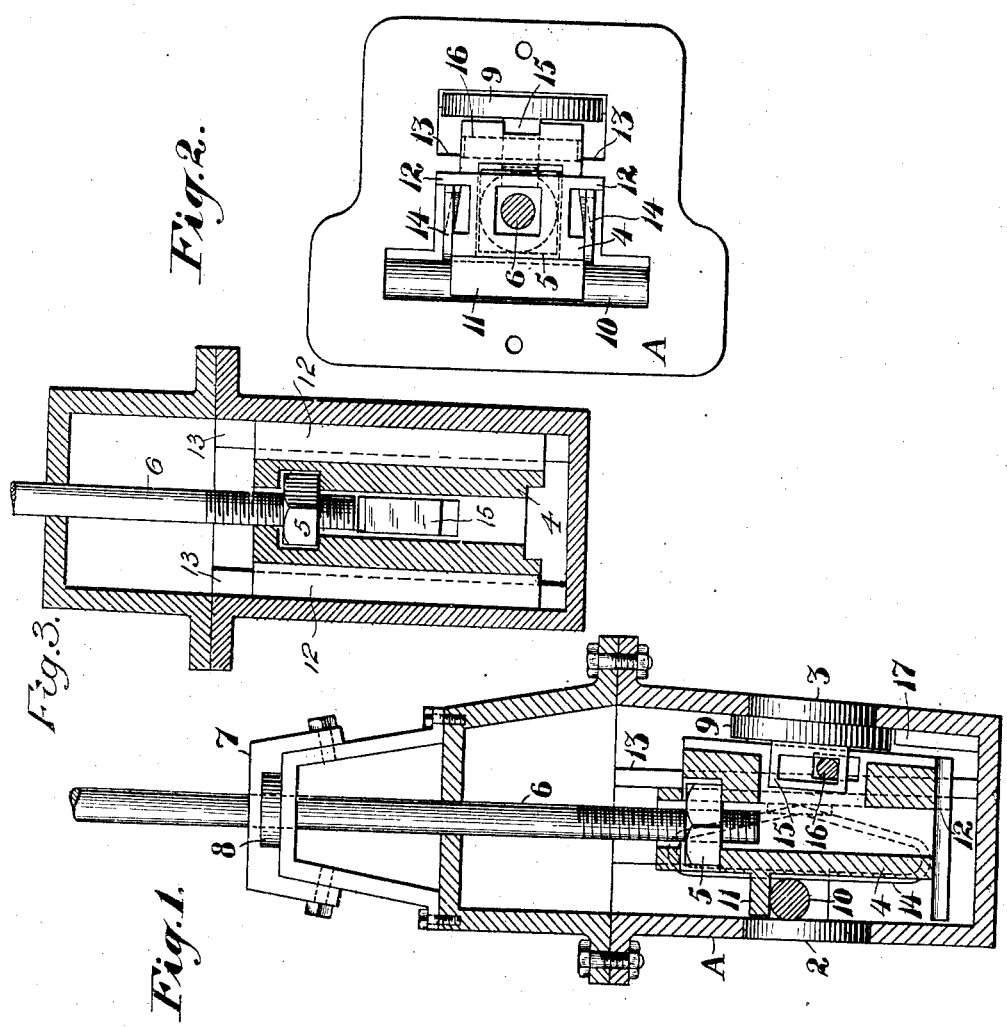

ADONIRAM J. COLLAR, OF YREKA, CALIFORNIA.

WATER GATE-VALVE.

No. 832,843.  Specification of Letters Patent.  Patented Oct. 9, 1906.

Application filed June 19, 1905. Serial No. 265,954.

*To all whom it may concern:*

Be it known that I, ADONIRAM J. COLLAR, a citizen of the United States, residing at Yreka, in the county of Siskiyou and State of California, have invented new and useful Improvements in Water Gate-Valves, of which the following is a specification.

My invention relates to an improvement in devices for controlling the flow of water in pipes, and is of that class known as the "straightway" gate-valves.

It consists in the combination of mechanism and in details of construction, which will be more fully explained by reference to the accompanying drawings, in which—

Figure 1 is a central vertical section of my device. Fig. 2 is a plan view of the casing, showing the gate mechanism. Fig. 3 is a vertical cross-sectional view.

My present invention is designed to provide improvements in the construction and operation of gate-valves which are designed to be moved transversely across the path through which the water passes.

A is the casing, of any suitable or desired shape adapted to contain the gate mechanism. This case has openings 2 and 3 at opposite sides. These openings are in line with the conducting-pipes through which the water flows. Within this casing is a shell 4, which is fitted to slide up and down transversely of the path of the water. The upper part of the shell has an opening within which is loosely fitted a nut 5, and through an opening in the top of the shell passes a stem 6, which screws into the nut, and by reason of the large size of the opening the nut is loosely movable with relation to the block.

The shank of the screw-threaded stem extends upwardly and has a fixed collar or flange 8, turnable in a chamber in the yoke 7, so that when the stem is rotated it will not be advanced in either direction, but by reason of its threaded end it serves to advance the shell which carries the valve, so as to open or close the latter. The yoke also serves as a guide to maintain the stem in proper alinement.

The casing is here shown with one of the sides inclined, and the valve 9 is closable against this side. The opposite side of the casing may be vertical, and a roller 10 is adapted to travel against the interior of this vertical side and between it and the shell 4, which carries the valve 9, so as to maintain the valve in proper position to close when the shell is depressed. Channels are made upon each side, within which the roller travels. The shell carries a projecting plate which contacts with the top of the roller when the gate has been closed. When the shell is raised to open the gate, the roller, with its ends traveling in these guide channels, will roll against the side of the casing and against the adjacent side of the shell, thus providing for an easy antifrictional movement of the shell.

The shell has upon each side projecting ribs, as at 12, and these ribs travel against guides 13, which are fitted within the casing and parallel with the side thereof against which the roller 10 travels. Thus the shell is caused to move in the straight line of its travel and to retain its true vertical position during its movement.

Fixed to the shell upon each side are elastic arms 14. These arms have straight edges projecting a little beyond the face of the shell which is contiguous to the roller 10 and which is of sufficient width to form a suitable bearing between it and the inner side of the casing, where the roller travels, and this spring-pressure serves to retain the ribs 12 of the shell in contact with the guides 13, and thus insure an even steady movement of the shell in its rise and fall. They also, by reason of their pressure against the roller, will cause it to roll when there is no water-pressure against the valve to insure such rolling contact.

The valve 9 has a shank 15 extending into an open slot in the side of the shell which is adjacent to the valve, and this shank is slotted vertically. The walls of the shell, which are in line with the slot of the shank, are similarly slotted, and a roller 16 passes through the slots of the shell and the shank and forms a bearing which allows the valve, when closed, to remain seated against its incline face until the shell has been raised sufficiently to reduce the wedge-like pressure by which the valve is firmly closed when the shell has been depressed to the lowest point. This reduction in pressure takes place by the raising of the wedge-shaped shell, and thus releases the valve, so that when the roller has reached the end of its travel in the slots a direct pull will be exercised by the upwardly moving shell to lift the valve and expose the passage through which the water may flow. When the shell is depressed to close the valve, the valve will be moved down with the shell until it has covered the water passage through its seat, and the further movement after the valve has been arrested by a stop on the inside of the shell, as shown at 17, will cause the wedge-shaped shell to act against the roller 16 until the valve is forced against its seat and made sufficiently tight. The lower end of the shell carries a projecting rib or lugs, against which the roller 10 contacts to limit the upward movement of the shell by preventing further rotation of the roller in the same manner that the contact of the roller with the projection or lug 11 limits the downward movement of the shell.

I have shown in the present construction only a single valve, and this may either close against the flow of water or in the direction toward which the water is flowing, the operation of the parts here described being the same in either case.

Having thus described my invention, what I claim, and desire to secure by Letters Patent, is—

1. The combination of a casing having an inclined seat, a transversely-slotted shell or carrier, means by which it may be reciprocated within the casing, a disk with a vertical slotted shank entering the shell or carrier, corresponding slots made in said shell, a roller passing through the slots of the shank and shell, vertical guides fixed within the casing, ribs upon the shell adapted to travel against said guides, and a roller-bearing between the opposite side of the casing and the shell.

2. The combination of a casing having an inclined seat upon one side and a substantially vertical face upon the opposite side, a shell or carrier, means by which it is movable vertically within the casing, ribs upon the shell, and guides fixed within the casing against which the ribs are slidable, a roller between the said opposite side of the shell and the interior of the casing, elastic bearings carried by the shell between which and the inner face of the casing, the roller rotates, and a valve carried by the shell and closable against the inclined seat.

3. The combination of a casing having an inclined valve-seat upon one side, a substantially vertical face upon the opposite side, guides within the casing parallel with the vertical face, a shell or carrier slidable against the guides, elastic arms fixed to the shell and projecting beyond its vertical face, and a roller revoluble between said arms and the said vertical face of the casing, whereby the shell is maintained in contact with the guides, and a valve carried by said shell and closable against the inclined seat.

4. The combination of a casing having an inclined seat upon one side and a vertical inner face upon the opposite side, guides within the casing parallel with the vertical face, a shell or carrier slidable against said guides, a roller revoluble between the vertical face of the casing and the corresponding face of the shell or carrier, and elastic means by which the shell is maintained in contact with the guides, a valve carried by the shell and closable against the inclined seat, and means by which the shell is raised or depressed, said means comprising a nut fitting loosely in the socket or chamber at the top of the shell, a screw-threaded stem turnable in the nut, said stem having a flange or collar and a yoke through which the stem passes and within which the stem and collar are turnable without advancing.

In testimony whereof I have hereunto set my hand in presence of two subscribing witnesses.

ADONIRAM J. COLLAR.

Witnesses:
 LEWIS F. COBURN,
 ROBERT J. NIXON.